S. LAKE.
INTERNAL COMBUSTION ENGINE.
APPLICATION FILED MAR. 7, 1914.

1,169,969.

Patented Feb. 1, 1916.
8 SHEETS—SHEET 4.

Witnesses
W. W. Finckel Jr.
Lillie M. Perry

Inventor
Simon Lake
by W. W. Finckel
Attorney

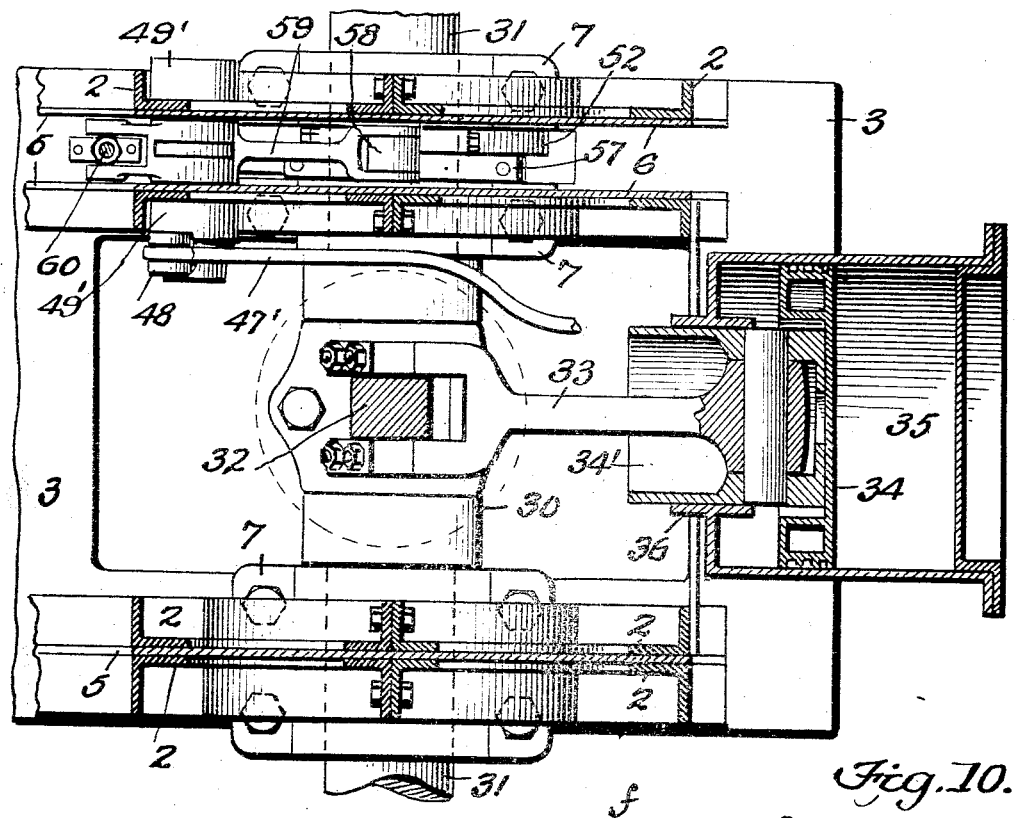

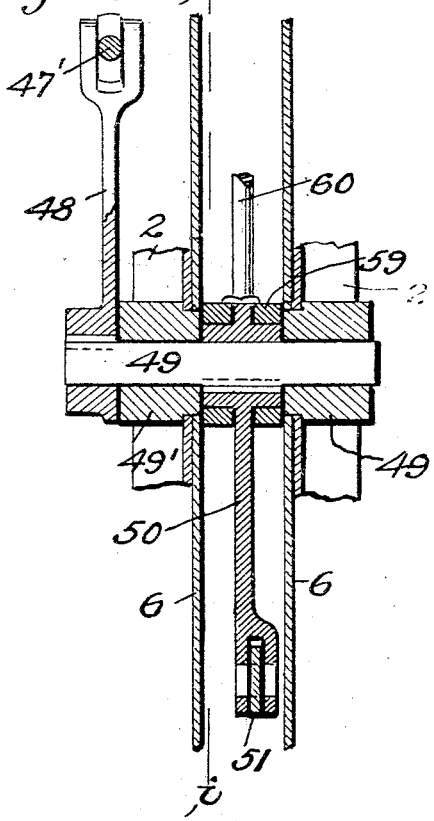
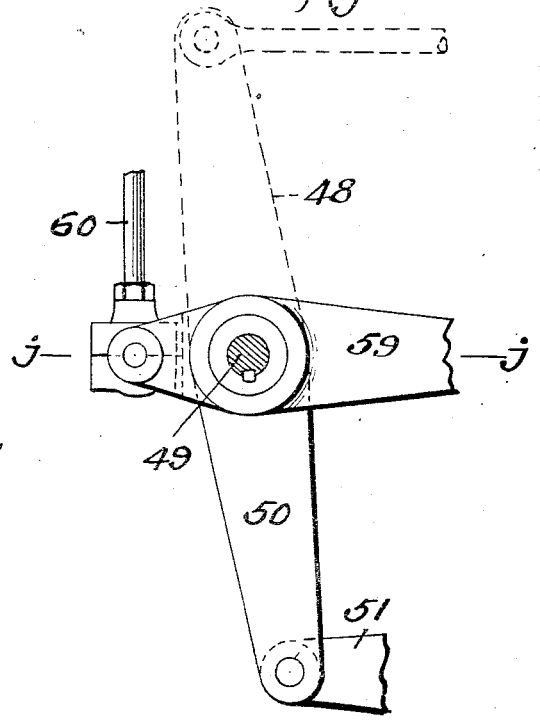
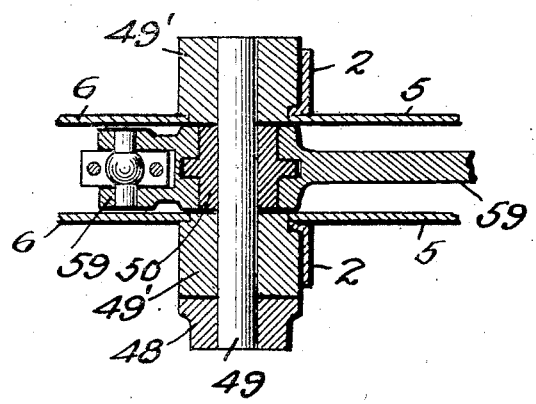
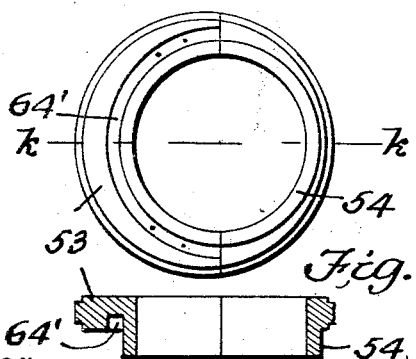
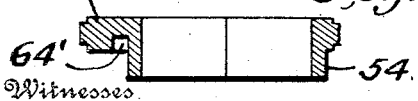

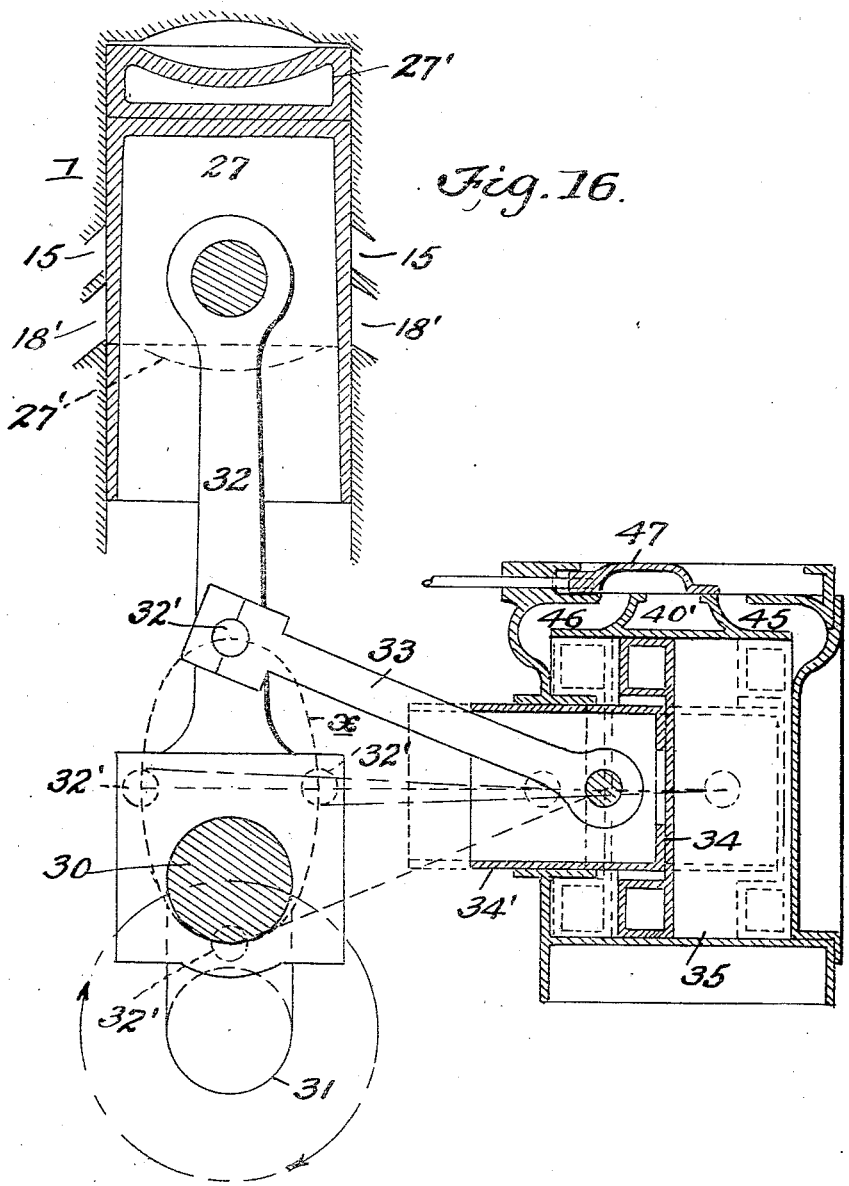

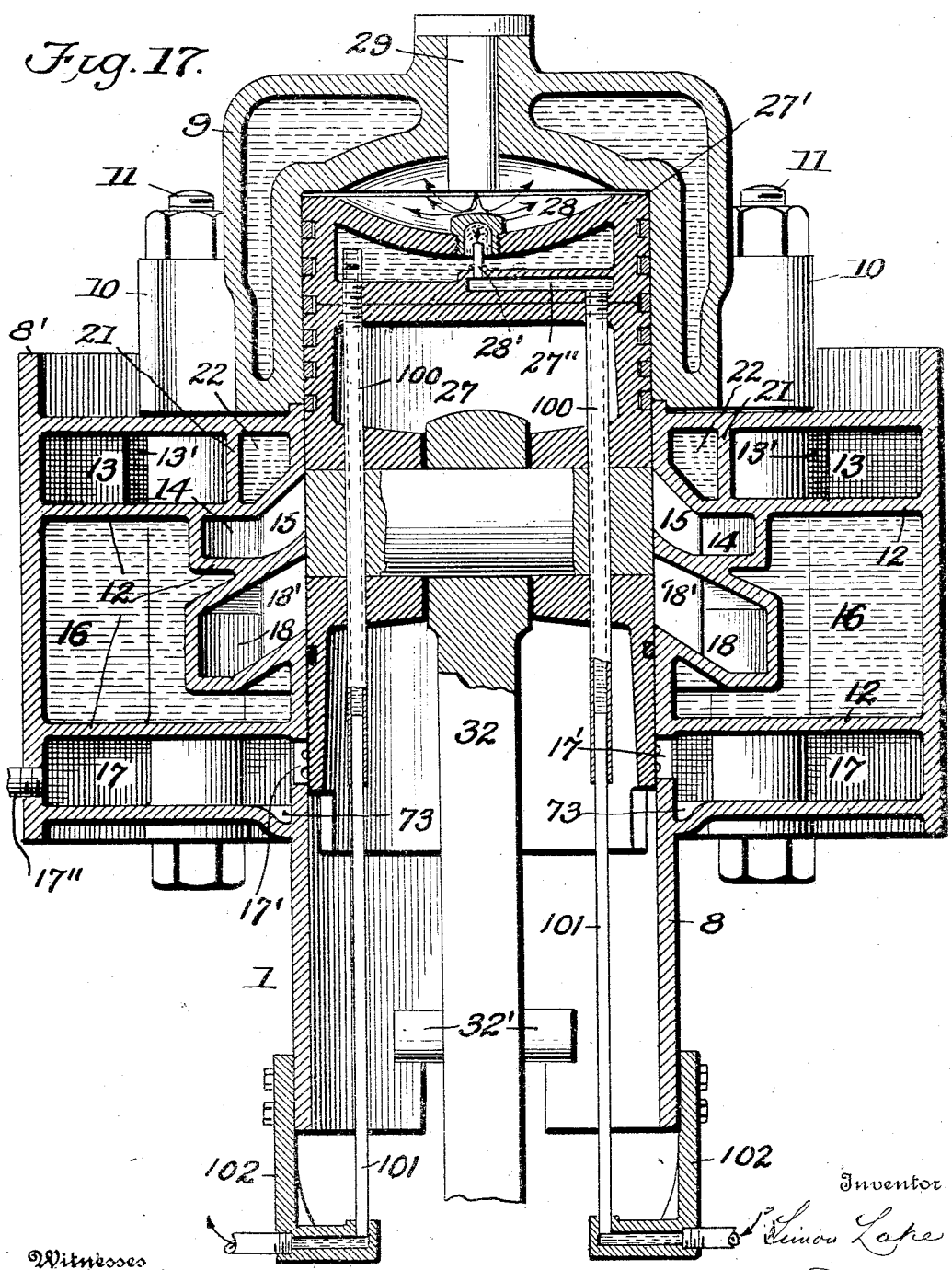

UNITED STATES PATENT OFFICE.

SIMON LAKE, OF MILFORD, CONNECTICUT.

INTERNAL-COMBUSTION ENGINE.

1,169,969.  Specification of Letters Patent.  Patented Feb. 1, 1916.

Application filed March 7, 1914. Serial No. 323,172.

*To all whom it may concern:*

Be it known that I, SIMON LAKE, a citizen of the United States, residing at Milford, in the county of New Haven and State of Connecticut, have invented certain new and useful Improvements in Internal-Combustion Engines, of which the following is a specification.

The prime object of the invention is to provide a simple, efficient and novel construction and arrangement of air-compressors for supplying scavenging-air to internal combustion engines, without resort to extraneous tanks and pumps or the like.

The invention consists of an internal combustion engine, having an air compressor cylinder and compressed air reservoir made as a part of the engine structure, the compressor piston being connected with and operated by the power piston, and so operated that the compression strokes of the air compressor piston are accelerated when the exhaust ports are open on each power stroke of the power piston, thereby forcing gusts of air into the power cylinder and giving a "following up" of the supply of scavenging air to the cylinder during the entire scavenging period, thus effecting a saving in the power of the engine and the storage space, as I will proceed now to explain and finally claim.

Figure 1:
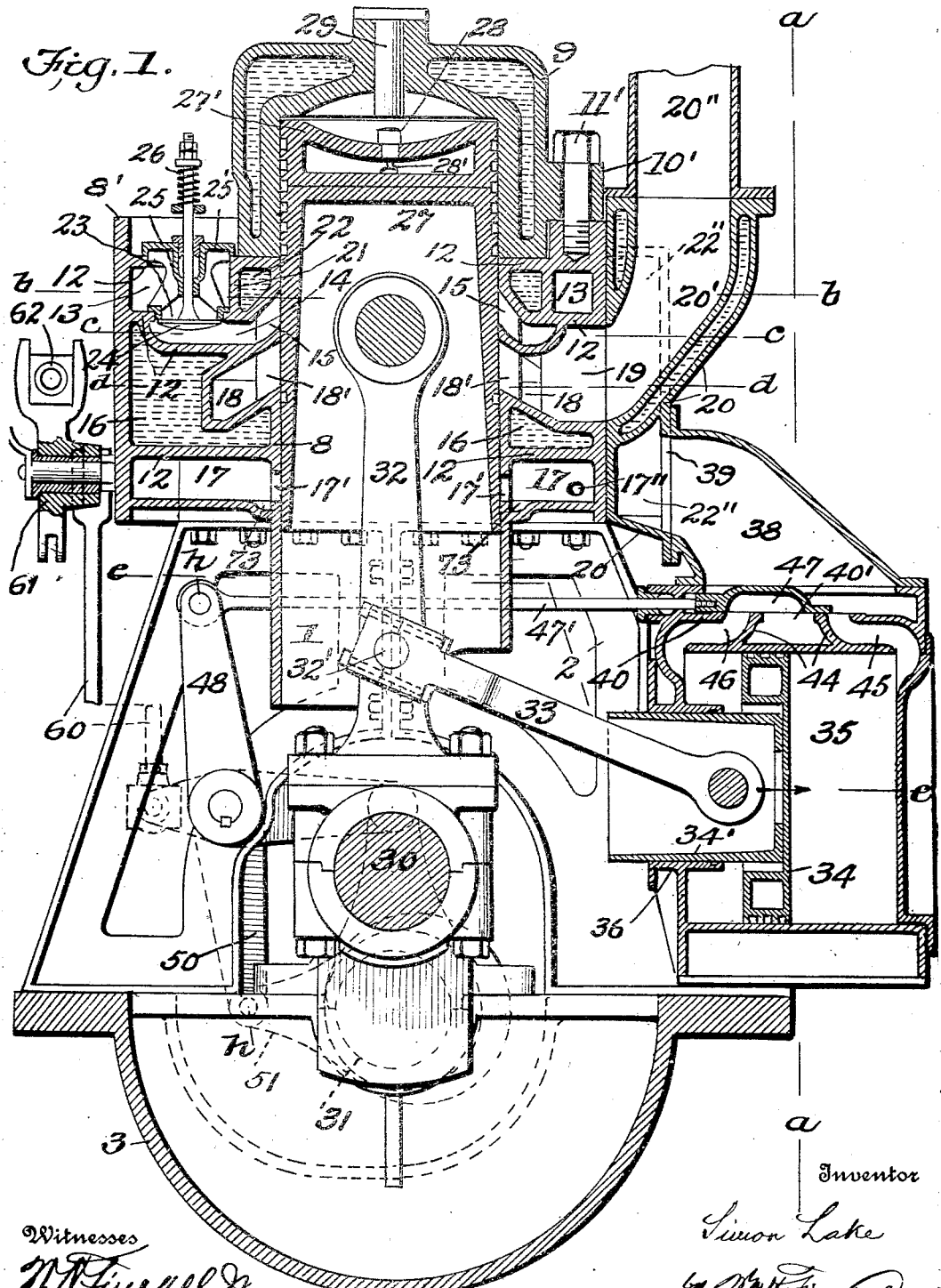
Figure 2:
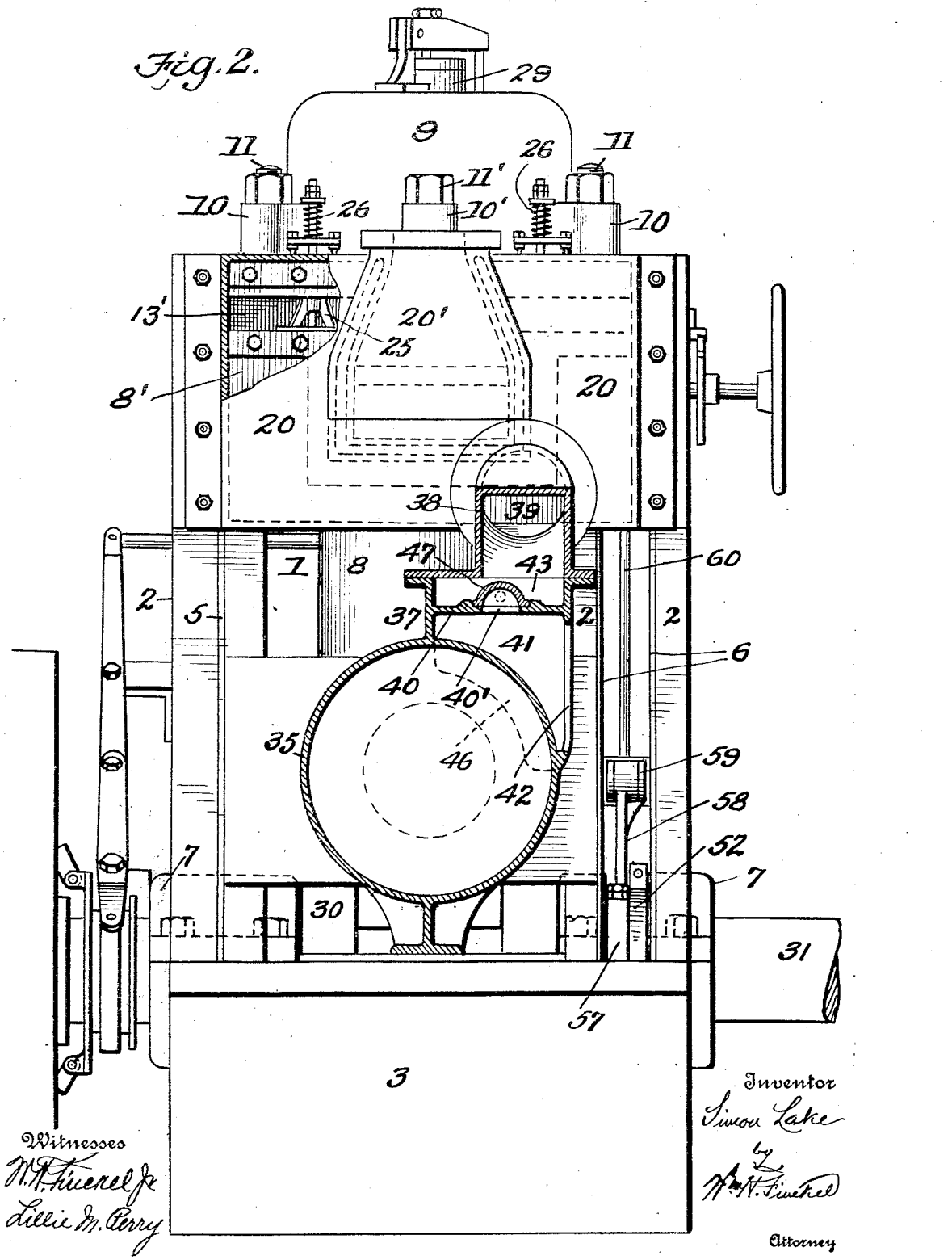
Figure 3:
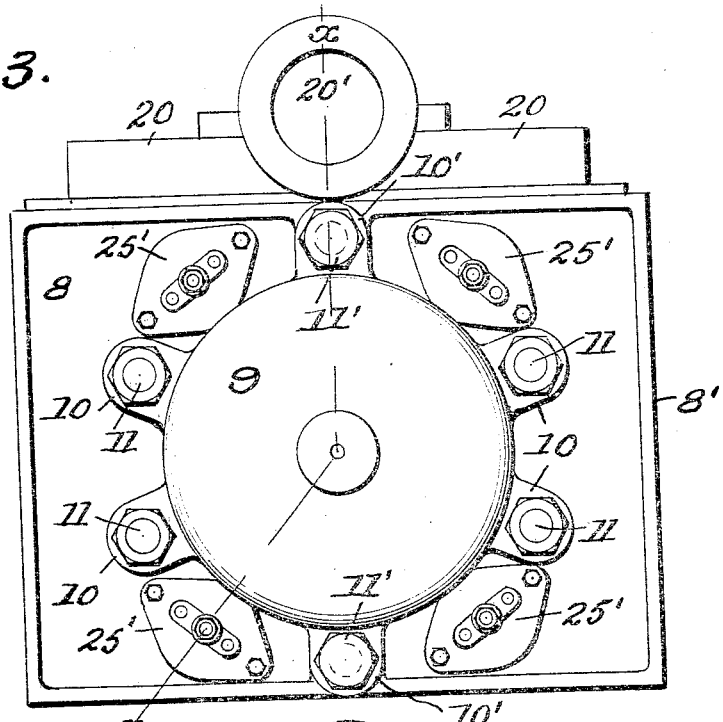
Figure 4:
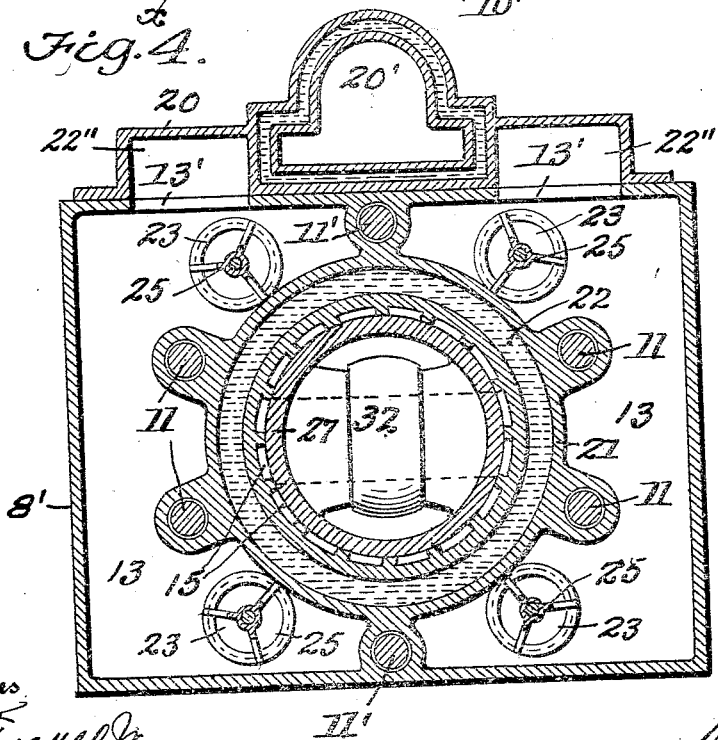
Figure 5:
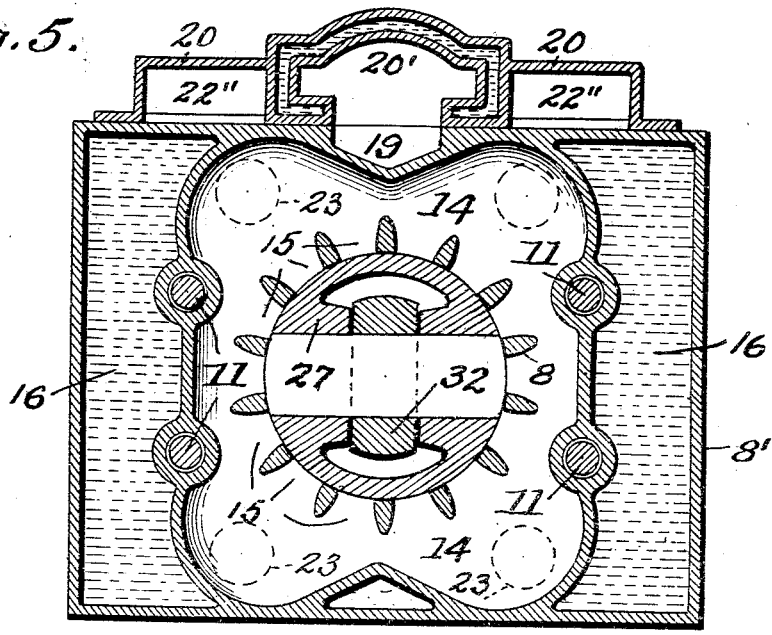
Figure 6:
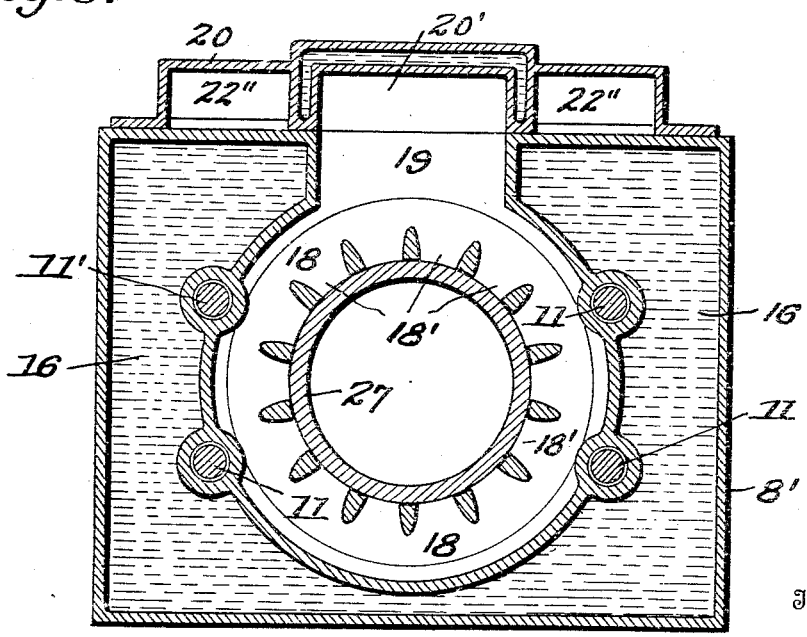

In the drawings, illustrating the invention, in the several figures of which like parts are similarly designated, Figure 1 is a vertical transverse section drawn through my engine on the irregular line $x$—$x$ of Fig. 3. Fig. 2 is a vertical longitudinal section drawn on the line $a$—$a$ of Fig. 1. Fig. 3 is a plan view. Fig. 4 is a horizontal section drawn through the scavenging-air reservoir or chamber of the power cylinder on the line $b$—$b$ of Fig. 1. Fig. 5 is a similar view drawn through the air passage and inlet ports of the cylinder on the line $c$—$c$ of Fig. 1. Fig. 6 is a horizontal section drawn through the exhaust passage and the exhaust ports of the cylinder on the line $d$—$d$ of Fig. 1. Fig. 7 is a horizontal section drawn through the air-compression cylinder, its piston and through the frame of the engine on the line $e$—$e$ of Fig. 1. Fig. 8 is a transverse section drawn through the power shaft adjacent to the eccentrics. Fig. 9 is a vertical section drawn through the eccentrics on the line $f$—$f$ of Fig. 8, the power shaft being shown in elevation. Fig. 10 is a detail section drawn on a larger scale on the line $g$—$g$ of Fig. 8. Fig. 11 is a vertical section drawn on the line $h$—$h$ of Fig. 1. Fig. 12 is a transverse section drawn on the line $i$—$i$ of Fig. 11. Fig. 13 is a horizontal section drawn on the line $j$—$j$ of Fig. 12. Fig. 14 is a side elevation of the eccentric carried by the power-shaft. Fig. 15 is a horizontal section of the eccentric drawn on the line $k$—$k$ of Fig. 14. Fig. 16 is a diagrammatic view illustrating the operation of the engine. Fig. 17 is a vertical longitudinal section drawn through the power piston and the power cylinder.

The invention relates to improvements in the construction and operation of heavy oil engines and particularly to the construction shown and described in an application filed by me April 27, 1912, Serial No. 693,701, and allowed October 16, 1913, now Patent No. 1,096,730, granted May 12, 1914, and I invite attention to my said application for the means employed for operating the fuel-inlet valves and the starting-air inlet valves and as I make no claim to these features in the present case I have not thought it necessary to illustrate or describe them herein.

In the present construction, 1 designates the power cylinder which is supported upon rectangular frames 2 extending from the base 3 of the engine. The frames 2 are constructed of angle-iron and preferably made in two sections which are bolted together when in position, their line of cleavage being directly above the axis of the crank-shaft of the engine. The construction of the frames in sections permits of the removal of the crank-shaft of the engine without necessitating the removal of the cylinder, it being understood that it is necessary to remove only one section of each of the frames in order that the shaft may be lifted from its bearings, the cylinder then being supported by the rear sections of the frames. The frame at the forward end of the engine is constructed of two sets of angle-bars having their transversely disposed webs arranged back to back and between these webs are arranged plates 5 which are securely connected to the said webs by rivets or by welding. The frame at the rear end of the engine is also constructed of two sets of angle-bars but they are spaced apart for a purpose as will hereinafter appear, and to the webs of each of these sets is also connected a plate 6 as shown. All of the frames are formed with arches which span the shaft bearings 7 thus allowing the removal of the bearing caps without necessitating the removal of the frames.

The cylinder is constructed of two sections, comprising a lower section 8 having a hollow rectangular jacket 8' formed integral therewith and surrounding the upper end of the cylindrical wall thereof, and an upper section 9, forming the head of the cylinder, which is provided with a water-jacketed wall that forms a continuation of the cylindrical wall of the said lower section. The upper section or head 9 is provided front and rear with lugs 10 to receive securing bolts 11 which pass down through tubular sleeves cast in the jacket 8', the sections being tightly drawn together by nuts fitted on the upper ends of the bolts. The sides of the cylindrical section of the head are also formed with lugs 10' through which pass stud-bolts 11' which screw into threaded sockets formed in the top of the jacket.

The space formed by the rectangular jacket 8' and the wall of the cylinder is divided by horizontal partitions 12 into an upper annular scavenging-air reservoir 13, an annular air-passage 14 which communicates with the reservoir through openings 23 formed in the upper partition 12, and with the combustion chamber of the cylinder through air-inlet ports 15 formed in and around the wall of the cylinder; a water jacket or chamber 16, and a bottom chamber 17 which communicates with the bore of the cylinder through leakage ports 17'. The water chamber 16 has formed in it an annular exhaust chamber or passage 18 which communicates with the cylinder through main exhaust ports 18' formed in and around the cylinder wall and which opens through the wall of the jacket through an opening 19 from which extends an exhaust pipe 20' formed in a hollow casting 20 secured to the wall of the jacket 8'. The top of the casting has a flange which surrounds the exhaust pipe 20' and forms a connection for a pipe 20" for conducting the exhaust gases away from the engine.

The chamber 17 provides a leakage or relief chamber and is designed to catch any gases that may escape around the piston past the main exhaust ports and thus prevent them from leaking through the lower end of the cylinder. This is an advantage, especially in marine engines, because it prevents the exhaust gases from escaping into the engine room. The said exhaust or relief chamber is provided with an outlet which is connected by a pipe 17", which may be connected to a suction fan (not shown) for drawing off the gas or which may be extended away from the engine and open into the atmosphere. The wall of the cylinder between the leakage ports 17' is formed with grooves (see Fig. 17) which establish communication between the said ports and provide passages for the gases escaping past the piston between the ports. The leakage or relief chamber has its bottom provided with an annular well 73 surrounding the cylinder wall, which well is designed to catch and hold any of the lubricating oil that may be scraped from the cylinder and thus prevent it from running out of the chamber 17 through the outlet 17" or being drawn off when a suction fan is employed.

Within the reservoir 13 is arranged an annular wall 21 which is cast integral with the top of the jacket 8' and the upper partition 12 and provides an annular water jacket space surrounding the cylinder wall. Cooling water is led into and away from the water jackets 16 and 22 in the well known way and it is not thought necessary to show this feature in the drawings.

The openings 23 in the upper partition 12 are controlled by puppet valves 24 carried by cages 25 extending through openings formed in the top of the jacket 8', the cages being provided at their lower ends with rings which fit the openings 23 and form seats for the valves. The cages at their upper ends are formed with disks 25' which are secured air-tight to the top of the jacket. The stems of the valves extend upwardly through the cages and are provided with light weight springs 26 which serve to hold the valves to their seats when the air inlet ports 15 are first uncovered to thus prevent the products of combustion from entering the scavenging-air reservoir, it being understood that the valves are also held to their seats by the excessive pressure in the combustion chamber until after the exhaust ports have been uncovered.

Operating in the power cylinder 1 is a power piston 27 having a hollow cap 27' mounted on the top thereof. The top of this cap is concaved and provided with a centrally disposed plug 28, of tungsten or other suitable material, which serves the purpose of scattering the fuel and deflecting it into the hot air surrounding the plug when the fuel is injected into the combustion chamber from the injector 29 extending through the top of the cylinder. The chamber in the cap 27' provides a cooling water jacket and in practice the plug 28 is formed with a cavity which opens through its lower end, and extended into the cavity is the upper end of a water-pipe 28' which extends from a water passage 27" cast in the cap 27' as shown in Fig. 17. Cooling water is led into and from the water-jacket of the cap through pipes 100 working telescopically on feed pipes 101 carried by brackets 102 connected to the lower end of the cylinder section 8. The piston is connected to the crank 30 of the power shaft 31, mounted in the base 3, through a connecting-rod 32, and carried by said rod is a wrist-pin 32' upon which is pivotally mounted the outer forked end of a connecting-rod 33 having its inner end journaled in a trunk-piston 34 operating in an air-compression cylinder 35 mounted horizontally on and transversely of the base 3, for supplying scavenging-air to the reservoir 13. The inner end of the cylinder 35 is formed with a central opening surrounded by a flange 36 through which the trunk 34' of the piston operates, and formed upon the top of the cylinder is an air-box 37 upon which is mounted a hood 38 extending from the hollow casting 20 mounted on the wall of the jacket 8' and surrounding an opening 39 therein. The space 22" in the casting 20 provides an air passage which communicates with the reservoir 13 through openings 13' formed in the wall of the jacket 8'.

The air-box is divided by a horizontal partition 40 into a lower chamber 41, which opens to the atmosphere through an opening 42 formed in the outer vertical wall of the box, and an upper chamber 43 which is in open communication with the hood 38. The chamber 41 is divided by transverse partitions 44 providing end air passages 45 and 46 leading respectively into the outer and inner ends of the compression cylinder from the upper compartment or chamber 42 and a central air passage or port 40' which opens into the chamber 43. The top of the horizontal partition is provided with ribs providing guides for a D-valve 47, the stem 47' of which operates through a stuffing box formed on the inner end of the air-box and has its outer end connected to the upper end of a lever 48 carried by a rock-shaft 49 journaled in bearings 49' secured to the outer faces of the transverse webs of the rear frames 2 and to the plates 6 carried thereby, and keyed on the said rock shaft between the said plates is the hub of a lever 50 to the lower end of which is connected an arm 51 extending from the strap 52 of an eccentric 53 mounted upon a sleeve 54 formed upon an eccentric 55 which is keyed upon the power shaft 31, the periphery of the sleeve being concentric with the power shaft. Operating on the eccentric 55 is an eccentric strap 57 having an upwardly extending arm 58 to the upper end of which is pivoted the inner end of a rock-lever 59 mounted intermediate its ends on the hub of the lever 50. To the outer end of the lever 59 is connected the lower end of a connecting rod 60 having its upper end connected to a rocking elbow-lever 61 (Fig. 1) mounted on the front wall of the rectangular section 8 and which is operatively connected to a reciprocating shaft 62 for operating the starting-air and the fuel inlet valves as shown in my said copending application, Serial No. 693,701.

The engine of this invention, like that shown in my aforesaid copending application, is of the reversible type, and as in all reversible engines, it is necessary to arrange the valve operating mechanism so that the valves will open at a different period relative to the position of the crank, and, of course, the piston, the operation of the valves being dependent solely on the position of the cam or cams for imparting motion to the valve operating mechanism for admitting starting air and fuel to the combustion chamber or chambers. To accomplish this result in my present construction I mount the eccentric 53 loosely on the sleeve 54 of the eccentric 55 and in one face of the latter I arrange a substantially semi-circular recess 64' which is concentric with the periphery of the sleeve and in which is held a block 64 carried by a bolt or pin extending from the eccentric 53, so that, when the engine is running in one direction the block will rest against one end of the recess to thus cause it and its eccentric 53 to be rotated with the eccentric 55, and when the direction of rotation of the eccentric 55 is reversed the opposite end of the recess will be brought up against the block to thus cause the eccentric 53 to rotate in the same direction as and with the eccentric 55. By thus operatively connecting the eccentrics it will be observed that when the direction of rotation of the engine is reversed the eccentric 55 will rotate in the eccentric 53 for practically one half of a revolution of the power shaft without operating the eccentric 53 so that by the time the block is brought up against the opposite end of the recess the power piston will have reached the proper position relative to the operation of the starting-air inlet valve before the eccentric 53 is operated to effect the opening of the valves.

The abutting faces of the eccentrics are arranged closely together so as to provide an air chamber or dash pot in the recess to cushion the seating of the block, and in order to permit the escape of the air from the recess I provide the eccentric 55 with small apertures which lead into the ends of the recess. It may be stated that the air in the recess is prevented from rapidly escaping between the abutting faces of the eccentrics by the oil used for lubricating the parts.

The operation of the engine is as follows: Assuming the engine to be running in the direction indicated by the arrow around the power shaft (Fig. 16) and that the power-piston is at the top of its return stroke, it will be observed that the eccentric 53 has been moved to rock the shaft 49 to adjust the valve 47 to uncover the port 45 in the outer end of the compression cylinder and to throw the central chamber into communication with the port 46 at the inner end of the cylinder. Now when the power piston 27 makes its down or power stroke the wrist pin 32' will be caused to travel through a semi-elliptical path as indicated by the broken lines in Fig. 16 which moves the air-compressing piston outwardly in its cylinder and forces the air in the outer end of the latter through the passage 45, hood 38 and passage 22'' into the reservoir 13, at the same time drawing a fresh supply into the inner end of the cylinder through the valve 47 and port 46. At the beginning of the down stroke of the power piston the air-compressing piston, owing to the path of movement of the wrist-pin, will be caused to move very rapidly and its movement will be gradually slackened as the wrist pin approaches the horizontal center of the compression cylinder and will reach the end of its stroke when the said wrist pin reaches the said center. Now as the down stroke of the power-piston continues the compressing piston will be drawn inwardly in the cylinder and the reverse movement to that described with respect to the outward movement of the piston will take place, that is, the movement will be accelerated as the power-piston nears the end of its power stroke so that, by the time the end of the inward stroke of the compressing piston is reached, the power piston will have uncovered the scavenging-air inlet ports 15 and the exhaust ports 18', thus permitting the scavenging air to rush into the power cylinder the moment the pressure therein has been reduced below that of the air in the reservoir and drive out all of the products of combustion and leave the cylinder filled with clean air, the valve 47, in the meantime, having been adjusted by the eccentric 53 to uncover the port 46 thus permitting additional quantities of air to be supplied to the reservoir and to the combustion chamber as long as the exhaust ports remain open, and a fresh supply of air to be furnished to the outer end of the compression cylinder through the valve 47 and the port 45. The accelerating movement of the piston while the exhaust ports are open is of great advantage, since it not only gives an impulse to the scavenging-air but takes place when most air is needed, that is, when the exhaust ports are open on each down stroke of the power piston, and gives a "follow up" of the air during the scavenging period, which avoids the necessity of pumping the scavenging-air up to such high pressures as is the practice now, which practice consumes considerable of the power of the engine. During the return stroke and on the next power-stroke of the power-piston, the air-compressing piston will be given two compression strokes, thus supplying the reservoir with a charge of scavenging air on each cycle of the engine, which charge is used in scavenging the combustion chamber at the end of each power stroke thus avoiding the necessity of pumping the scavenging-air against such excessive pressures as is common with other types of engines. It will be particularly noted that the moment the exhaust ports are uncovered by the piston the pressure in the combustion chamber will be reduced below that of the pressure in the scavenging-air reservoir and therefore the valves 24 will be automatically unseated and will allow the scavenging-air to rush into the combustion chamber, and, owing to the peculiar connection of the compressing piston the latter will continue its inward compression stroke while the exhaust ports are open on the return stroke of the power piston so that a "follow up" supply of scavenging-air is furnished from the compressor.

While I have shown the air-compression cylinder provided with a D slide-valve I do not wish to be limited to this form of valve as ordinary puppet valves may be used with equal advantage.

It will thus be seen that I provide an exceedingly simple and highly efficient method of supplying scavenging-air at the least expenditure of the engine's power, and while I illustrate the application of the mechanism to high pressure types of engines wherein the air is first compressed to such an extent that the fuel will be ignited when injected into the cylinder, I do not limit myself to this particular arrangement, as the fuel may be injected into the cylinder at any point on the up stroke of the piston after the exhaust ports are closed, and ignited by a spark-plug, a hot bulb or any well known method. However, in high compression engines where the fuel is admitted near or at the end of the compression stroke of the piston, and into a very hot chamber, the fuel will strike against the plug, which is much cooler than the head of the piston, and will be deflected into the surrounding hot air before being ignited.

What I claim is:

1. In a single-acting internal combustion engine, comprising a power cylinder having scavenging-air inlet ports and exhaust ports in the wall thereof, the combination with a horizontally disposed double-acting scavenging-air compression cylinder communicating with said inlet ports, a valve controlling the communication, means for operating said valve, and a compressing piston working in said compression cylinder having its connecting rod connected to the connecting rod of the power piston in such manner that two gusts of scavenging air are introduced into the power cylinder during each exhaust period.

2. In a single-acting internal combustion engine, comprising a power cylinder having scavenging-air inlet ports and exhaust ports in the wall thereof, and a compressed-air reservoir communicating with said inlet ports, and a power piston working in the cylinder controlling said ports, the combination with a transversely arranged double-acting scavenging-air compression cylinder for supplying scavenging air to said reservoir, and a compressing piston working in said compression cylinder having its connecting rod connected to the connecting rod of the power piston so that two pulsations of scavenging air are introduced into the power cylinder during each exhaust period.

3. In a vertical single-acting internal combustion engine, comprising a power cylinder having scavenging-air inlet ports and exhaust ports in the vertical wall thereof, an air reservoir surrounding said air inlets and communicating therewith, and a power piston working in said cylinder controlling said ports, the combination with a double-acting scavenging-air compression cylinder arranged transversely of the engine having its outlet communicating with said air reservoir, a compressing piston working in said compression cylinder having its connecting rod connected to the connecting rod of the power piston so that two pulsations of scavenging air are introduced into the power cylinder during each exhaust period, and a valve operatively connected to the power shaft of the engine controlling the communication between the said compression cylinder and the said reservoir.

4. A single-acting internal combustion engine, comprising a power cylinder having scavenging-air inlet ports and exhaust ports in the wall thereof, an air reservoir formed integral with and surrounding the wall of the cylinder and communicating with said air inlet ports, a power piston working in said cylinder controlling said ports, a double-acting scavenging-air compression cylinder communicating with said air reservoir, and a compressing piston working in said compression cylinder operatively connected to the connecting rod of the power piston so that a following up of the scavenging air is given during the exhaust period.

5. A single-acting internal combustion engine, comprising a power cylinder having scavenging-air inlet ports and exhaust ports arranged in the wall thereof, a power piston working in the cylinder controlling said ports, a rectangular jacket formed integral with the cylinder and having an annular scavenging-air reservoir communicating with said air inlet ports and an annular exhaust passage communicating with said exhaust ports, valves controlling the communication between the reservoir and inlet ports, a double-acting air compression cylinder arranged transversely of the engine communicating with the said reservoir, and a compressing piston working in said compression cylinder having its connecting rod connected to the connecting rod of the power piston, so that two gusts of scavenging air are introduced into the power cylinder during each exhaust period.

6. A single-acting internal combustion engine, comprising a power cylinder having scavenging-air inlet ports and exhaust ports in the wall thereof, a power piston working in the cylinder controlling said ports, a jacket formed on the cylinder providing an annular scavenging-air reservoir which communicates with the air inlet ports, an annular exhaust passage in open communication with the exhaust ports, and a double-acting air-compressor for supplying scavenging-air to said reservoir, and for giving a following up of the scavenging-air during the exhaust period, said compressor being arranged transversely of the engine and operatively connected to the connecting rod of the power piston.

7. An internal combustion engine, comprising a power cylinder having scavenging-air inlet ports and exhaust ports in the wall thereof, a power piston working in the cylinder controlling said ports, a jacket formed upon the cylinder providing an annular scavenging-air reservoir which communicates with the air inlet ports and an annular exhaust passage in open communication with said exhaust ports, inwardly opening automatic valves controlling the communication between said reservoir and said air inlet ports, a double-acting air-compressor for supplying scavenging air to said reservoir, said air compressor being operatively connected to the connecting rod of said power piston.

8. A single-acting internal combustion engine, comprising a power cylinder having scavenging-air inlet ports and exhaust ports arranged in the wall thereof, a power piston working in said cylinder controlling said ports, a jacket formed integral with the cylinder providing an annular scavenging air reservoir which communicates with said inlet ports and an annular exhaust passage in open communication with said exhaust ports, a double-acting air compression cylinder mounted on the engine transversely thereof, and an air compressing trunk-piston working in the compression cylinder having its connecting rod connected to the connecting rod of the power piston whereby two pulsations of scavenging air are obtained for each exhaust period.

9. An internal combustion engine, comprising a power cylinder having scavenging-air inlet ports and exhaust ports in the wall thereof, a power piston working in the cylinder controlling said ports, a jacket formed integral with the cylinder providing an annular scavenging-air reservoir which communicates with the said inlet ports and an annular exhaust passage in open communication with the said exhaust ports, valves controlling the communications between said reservoir and said inlet ports, an air compression cylinder mounted on the base of the engine transversely thereof, a trunk-piston working in said compression cylinder having its connecting rod pivotally connected to the connecting rod of the power piston, an air-box formed on said compression cylinder, horizontal and transverse partitions formed in the air-box, said horizontal partition having ports which communicate with the opposite ends of the compression cylinder and a central port which opens to the atmosphere, a D-valve controlling said ports substantially as described, and means for operating said valve.

10. An internal combustion engine, comprising a vertical power cylinder, having scavenging-air inlet ports and exhaust ports in the wall thereof, a jacket formed integral with the cylinder providing a scavenging-air reservoir communicating with said air inlet ports and an annular exhaust passage in open communication with said exhaust ports, a double-acting air compressor having its cylinder arranged transversely of the engine and operatively connected with the connecting rod of the power piston, means connecting the compressor with said scavenging-air reservoir, a valve controlling the passage of air from the compressor to said reservoir, and an eccentric carried by the power shaft of the engine for operating the valve, substantially as specified.

11. An internal combustion engine, comprising a vertical power cylinder constructed of a lower section and an upper section forming the head of the cylinder, said lower section having scavenging-air inlet ports and exhaust ports arranged in the wall thereof, a jacket formed on said lower section having partitions providing an annular scavenging-air reservoir which communicates with said inlet ports and an annular exhaust passage in open communication with the said exhaust ports, valves controlling the communication between said reservoir and said air inlet ports, a double-acting air compressor having its cylinder disposed transversely of the engine, said compressor being operatively connected with the connecting rod of said power piston so that two charges of air are supplied to said reservoir on each cycle of the engine, an air passage between said compressor and said reservoir, and a valve controlling the admission of air to and from the compressor, and means for operating said valve.

12. An internal combustion engine, comprising a power cylinder having scavenging-air inlet ports, main exhaust ports and leakage ports arranged in the wall thereof, a jacket formed on the cylinder providing an annular scavenging-air reservoir communicating with said air inlet ports, an annular exhaust passage in open communication with said main exhaust ports and an auxiliary exhaust chamber communicating with said auxiliary exhaust ports, a power piston working in said cylinder controlling said ports, and an air compressor operatively connected with the power piston for supplying scavenging air to said air reservoir.

13. An internal combustion engine, comprising a base having a crank-shaft mounted therein, sectional transversely arranged frames extending from the base, a power cylinder mounted on said frames having scavenging-air inlet ports and exhaust ports in the wall thereof, a power piston working in the cylinder controlling said ports and connected to said crank-shaft, a rectangular jacket formed on said cylinder providing a scavenging-air reservoir communicating with said air inlet ports and an exhaust passage in open communication with said exhaust ports, an air compression cylinder mounted on the base transversely thereof, a compressing piston working in said cylinder and operatively connected to the connecting rod of said power piston so that two charges of air are supplied to said reservoir on each cycle of the engine, and an air conduit connecting said air-compression cylinder with said scavenging-air reservoir.

14. An internal combustion engine, comprising a power cylinder having scavenging-air inlet ports, main exhaust ports and leakage ports arranged in the wall thereof, a power piston working in the cylinder controlling said air inlet ports and said main exhaust ports, a scavenging air reservoir communicating with said air-inlet ports, an exhaust chamber communicating with said main exhaust ports and a leakage chamber communicating with said leakage ports, means for supplying scavenging-air to said reservoir, and means for conducting gases from said leakage chamber.

15. An internal combustion engine, comprising a base, sectional frames mounted thereon, a power cylinder mounted on said frames, said cylinder having scavenging-air inlet ports and exhaust ports leading into the combustion chamber thereof, and leakage ports in and surrounding the wall thereof, for the purpose specified, a scavenging-air reservoir formed on the cylinder and communicating with said air inlet ports, a main exhaust chamber and a leakage chamber formed on the cylinder and communicating respectively, with said exhaust ports and leakage ports, a power piston working in said cylinder, means for supplying scavenging-air to said reservoir, and means for conveying gases from said leakage chamber.

16. An internal combustion engine, comprising a base, a sectional frame mounted thereon, a power cylinder mounted on said frame and having scavenging-air inlet ports and main exhaust ports leading into the combustion chamber thereof, a power piston working in said cylinder, leakage ports formed in the wall of the cylinder and located so that they will be below the top of the piston when it is at the bottom of its stroke, for the purpose specified, means to supply scavenging air to said air reservoir, and means for conducting gases from said leakage ports.

17. An internal combustion engine, comprising a base, a sectional frame mounted thereon, a power cylinder mounted on said frame, said cylinder having scavenging-air inlet ports and main exhaust ports leading into the combustion chamber thereof, a power piston working in said cylinder, leakage ports arranged in the wall thereof, a main exhaust chamber and a leakage chamber formed on said cylinder communicating respectively, with said main exhaust ports and said leakage ports, means to supply scavenging-air to said air inlet ports, and means to convey gases from said leakage chamber.

18. An internal combustion engine, comprising a power cylinder having main exhaust and scavenging-air inlet ports communicating with the combustion chamber thereof and leakage ports arranged in its wall, a power piston working in said cylinder, said leakage ports being so located that they will be below the top of the piston when the latter is at the bottom of its stroke, a chamber surrounding said cylinder and communicating with said leakage ports, means for conveying gases from said chamber, and means to supply scavenging-air to said air inlet ports.

19. An internal combustion engine, comprising a power cylinder having scavenging-air inlet ports and main exhaust ports communicating with the combustion chamber thereof, and leakage ports arranged in the wall of the cylinder below said combustion chamber, a power piston working in said cylinder, said leakage ports being located below the top of the piston when the latter is at the bottom of its stroke, and a jacket formed on said cylinder providing an exhaust chamber which communicates with said leakage ports, said chamber having an annular oil well surrounding the cylinder wall, substantially as and for the purpose specified.

20. In combination with an internal combustion engine, a power cylinder having leakage ports arranged in its wall below the top of the piston when the latter is at the bottom of its stroke, an exhaust chamber formed on the cylinder and communicating with said leakage ports, and means for conveying gases from said chamber.

21. In combination with an internal combustion engine, a power cylinder having leakage ports in its wall below the top of the piston when the latter is at the bottom of its stroke, an exhaust chamber surrounding said cylinder and communicating with said ports, said chamber having an oil well arranged adjacent to the wall of the cylinder, and means for conveying gases from said chamber.

22. In an internal combustion engine, the combination with a power cylinder having a fuel inlet leading into the combustion chamber through the head of the cylinder, a power piston working in the cylinder having a chamber in its upper end, a water passage formed in the said chamber, a plug of refractory material mounted on the top of the piston and having a cavity communicating with said chamber, a pipe from said water passage and extending into the cavity of the plug, means to supply cooling water to said water passage, and means for conducting the water from said chamber, for the purpose specified.

23. In a single-acting internal combustion engine, a power cylinder having scavenging air inlet ports and exhaust ports in its wall, a double-acting air compressor operatively connected with said engine, and means of communication between said compressor and said power cylinder whereby two pulsations of scavenging air are supplied to said power cylinder during each exhaust period.

24. In a single-acting internal combustion engine, a power cylinder having scavenging air inlet ports and exhaust ports in its wall, a double-acting air compressor operatively connected with a moving part of said engine whereby two compression strokes of said compressor are obtained on each cycle of the engine, and communication between said compressor and said scavenging air inlet ports whereby two pulsations of air from said compressor are introduced into said power cylinder during each exhaust period.

25. In a single-acting internal combustion engine, a power cylinder having scavenging air inlet ports and exhaust ports in its wall; a double-acting air compressor operated by said engine, and means for conducting both charges of air from said double-acting compressor to said power cylinder successively during each exhaust period.

26. In an internal combustion engine, a power cylinder having exhaust ports and scavenging air inlet ports and a double-acting air compressor operated by said engine and in communication with said air inlet ports whereby two gusts of air are forced into the power cylinder during each exhaust period.

In testimony whereof I have hereunto set my hand this 4th day of March, A. D. 1914.

SIMON LAKE.

Witnesses:
JAMES A. PEASE,
ROBERT A. BEERS.